United States Patent [19]
Burrows

[11] Patent Number: 5,710,724
[45] Date of Patent: Jan. 20, 1998

[54] DYNAMIC COMPUTER PERFORMANCE MONITOR

[75] Inventor: Michael Burrows, Palo Alto, Calif.

[73] Assignee: Digital Equipment Corp., Maynard, Mass.

[21] Appl. No.: 425,562

[22] Filed: Apr. 20, 1995

[51] Int. Cl.$^6$ .................................................. G06F 11/00
[52] U.S. Cl. ............... 364/551.01; 364/550; 364/262.4; 364/280.1; 364/280.4; 364/264.1; 364/265.6; 364/269.4; 395/704; 395/705; 395/183.11; 395/183.14; 395/183.1; 395/183.21; 395/185.04
[58] Field of Search ............... 364/551.01, 550, 364/262.4, 264, 264.1, 265.6, 269.3, 269.4, 280.1, 280.4; 395/183.01, 183.11, 183.21, 700, 375, 704, 705, 416, 418, 412, 413, 419, 421.11, 185.04, 185.02, 183.1, 183.14

[56] References Cited

U.S. PATENT DOCUMENTS

| | | | |
|---|---|---|---|
| 4,231,106 | 10/1980 | Heap et al. | 364/550 |
| 4,740,895 | 4/1988 | Sargent et al. | 395/183.01 |
| 5,313,616 | 5/1994 | Cline et al. | 395/500 |
| 5,335,344 | 8/1994 | Hastings | 395/183.11 |
| 5,386,522 | 1/1995 | Evans | 395/704 |
| 5,430,878 | 7/1995 | Straub et al. | 395/712 |
| 5,481,688 | 1/1996 | Takagi | 395/418 |
| 5,528,753 | 6/1996 | Fortin | 395/183.11 |
| 5,535,329 | 7/1996 | Hastings | 395/183.11 |
| 5,537,541 | 7/1996 | Wibecan | 395/183.21 |
| 5,539,907 | 7/1996 | Sirvastava et al. | 395/705 |
| 5,560,013 | 9/1996 | Scalzi et al. | 395/705 |

OTHER PUBLICATIONS

Hollingsworth, et al, "Dynamic Program Instrumentation for Scalable Performance Tools," Technical Report 1207, Computer Sciences Department, University of Wisconsin–Madison, Madison, Wisconsin, 1993, pp. 1–23.

ACM SIGPLAN NOTICES, ACM Press, vol. 29, No. 1, Jan. 1994, Reiser, et al, "Program Profiling Problems, and a Solution via Machine Language Rewriting," pp. 37–45.

*Primary Examiner*—James P. Trammell
*Assistant Examiner*—Tuan Q. Dam
*Attorney, Agent, or Firm*—Dirk Brinkman

[57] ABSTRACT

In a computer system, an instrumented program associated with a first paging table is stored in a memory. The memory also stores an instrumented version of the uninstrumented program associated with a second paging table. The instructions of the uninstrumented and instrumented programs are stored at identical relative addresses. The instrumented programs also includes one word instrumentation points and instrumentation routines to monitor the performance of the computer system. Activating the first paging table causes the uninstrumented program to execute, and activating, in response to a single, the second paging table causes the instrumented program to execute. The instrumentation points cause execution flow to be routed through a gap between word aligned procedures of the program to a routing table, and then instrumentation routines. The gap includes instructions which randomly distributes the execution flow through the routing table.

17 Claims, 8 Drawing Sheets

DYNAMIC COMPUTER PERFORMANCE MONITOR

FIELD OF THE INVENTION

This invention relates generally to computer systems, and more particularly to monitoring the performance of computer systems while executing software programs.

BACKGROUND OF THE INVENTION

Measuring the performance of computer systems while software programs are executing is an important step in the development of computer systems. One method which is frequently used to measure the performance of computer systems is called instrumentation. Instrumentation is the process of adding instructions to a software program at predetermined locations. The added instructions typically sample states of execution and data of the computer system.

Generally, the added instructions temporarily divert the execution flow to "instrumentation routines." The instrumentation routines can be designed to collect specialized performance metrics or data. The performance data may be stored in memory as tables to indicate execution counts and data accesses for various portions of the program. The data of the tables can later be presented in the form of, for example, histograms. Because of the additional instructions, instrumented programs tend to be larger, and execute slower than uninstrumented original programs.

It is desired to dynamically enable and disable the collection of performance data generated by instrumented software programs. For example, while the computer system is operating certain conditions may arise which warrant detailed examination. This may not be a problem if the program is an application program. Here, the instrumented or uninstrumented version of the application can be loaded, as required, when the application is activated.

However, most operating system programs, and some application software programs need to run continuously. Once they are loaded they continue to execute until the entire computer system is stopped. In contrast, the need to collect performance data may be periodic. It is a burden to start the operation of the computer system with an instrumented version of the software programs whenever performance data gathering is desired, and then to restart the system with the uninstrumented programs when the sampling period expires.

In some known systems, a centrally maintained flag is used to enable and disable performance measurement. For example, the instrumentation routines, while executing, can dynamically check the central flag to see if performance data should be collected, or not. The problem with this approach is that it requires the continuous execution of the larger and slower instrumented version of the program, even while performance data gathering is disabled.

There have been some systems which apply instrumentation to software programs while the programs are executing. However, here the instrumentation tends to be to a very small number of localized areas of the program. In addition, if the instrumentation is effecting a frequently executing potion of the program, great care must be taken while instructions are removed to make room for the instrumentation instructions. If the point of instrumentation is inside a frequently executed loop, processing may need to be suspended, upsetting the natural flow of execution.

There are some performance measurement techniques which do not rely on instrumentation. For example, performance statistics can be derived by sampling the processor's program counter (PC). Such techniques may be adequate for a limited analysis of execution flow of the computer. However, PC sampling gives no information about the changes of the data states of the computer system. Data states can only be understood by a more detailed observation of memories, caches, and registers.

Therefore, there is a need for a performance monitoring technique which can be dynamically enabled while computer systems are executing software programs. The technique should allow one to instrument the software without changing the relative location of the stored instructions, or drastically changing the execution flow. Furthermore, the technique should permit normal operation of the computer system while performance monitoring is disabled.

SUMMARY OF THE INVENTION

In a computer system, an uninstrumented program associated with a first paging table is stored in a memory. The memory also stores an instrumented version of the program which is associated with a second paging table. The instructions of the uninstrumented and instrumented programs are stored at identical relative addresses. The instrumented program also includes one word instrumentation points and instrumentation routines to monitor the performance of the computer system.

Activating the values of the first paging table causes the uninstrumented program to execute, and activating, in response to a signal, the values of the second paging table causes the instrumented program to execute. The instrumentation points route execution to a gap between word aligned procedures of the program to entries in a routing table, and then to instrumentation routines. The gap includes instructions which randomly distributes the execution flow through the routing table.

In one embodiment, the procedures are aligned on four-word boundaries of the memory, e.g. the gaps are either, zero, one, two, or three words. The entries of the routing table are determined from a sum of the return address of the instrumentation point and a constant. The constant is the difference between an address which is approximately in the middle of the routing table and the address of the gap. The entries in the routing table are branch instructions to the instrumentation routines.

DETAILED DESCRIPTION OF THE PREFERRED EMBODIMENT

Figure 1:
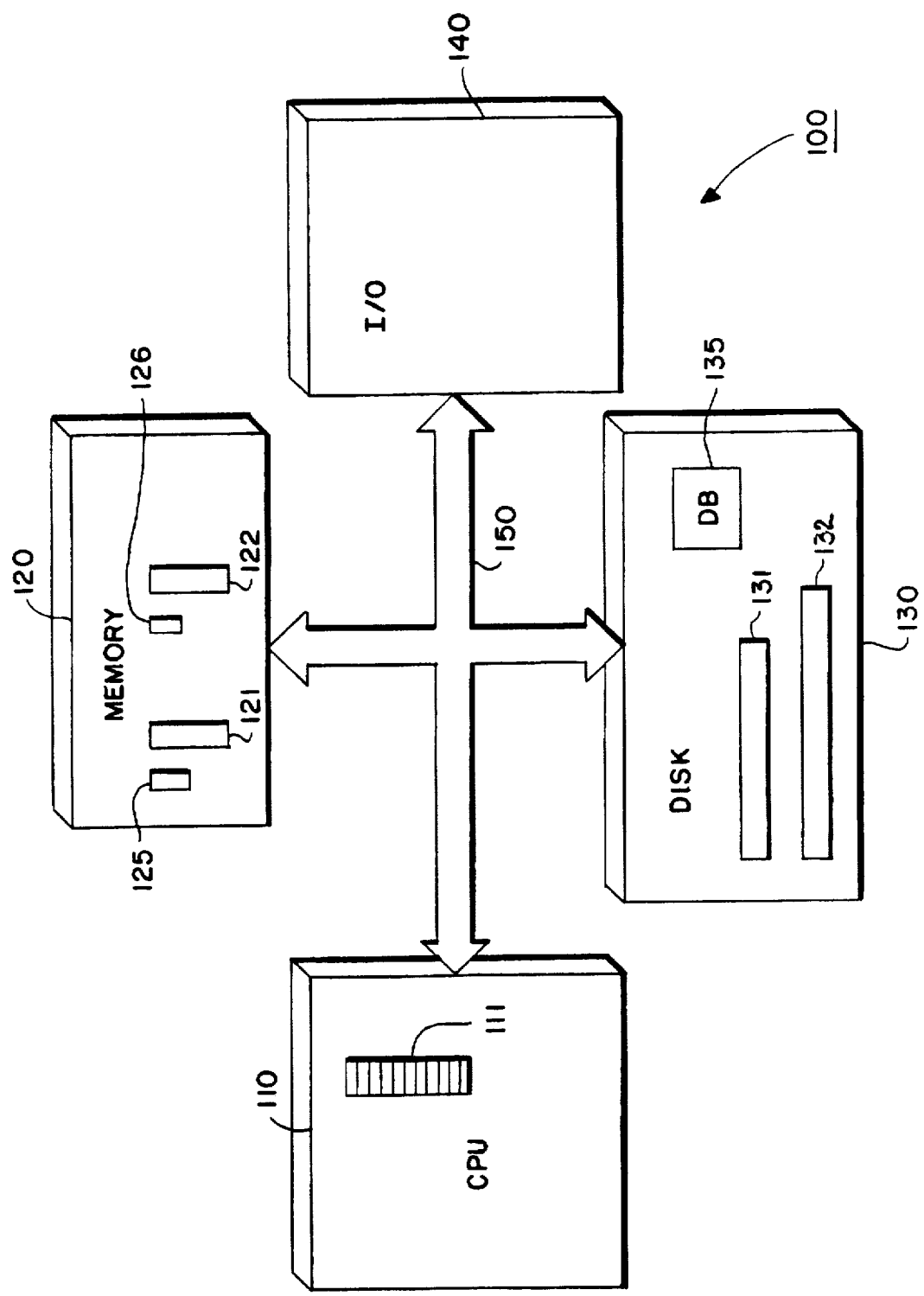
FIG. 1 is a block diagram of a computer system having software programs modified for instrumentation according to the principles of the invention.

Now turning to FIG. 1, a computer system 100 can include a central processing unit (CPU) 110, a memory 120, a disk storage device 130, and an input/output interface (I/O) 140. The components are connected to each other by a communications bus 150.

The CPU 110 can include one or more processors for executing instructions. Associated with the processors are banks of registers 111. The registers 111 are used to store data being immediately manipulated by the CPU 110. The memory 120 can be configured to be random access, and the memory 120 is further partitioned into memory pages. The pages can be physical or virtual, virtual meaning the pages are defined outside of the physical memory 120, for example, the disk 130. Virtual memory allows the use of memory addresses which exceed the capacity of the physical memory 120.

The disk 130 can be magnetic or optical, fixed or removable. The I/O interface 140 can communicate with other computer system components, local or remote. The bus 150 carries timing, control, address, and data signals while the system 100 is operating.

During operation of the computer system 100, the CPU 110 executes instructions in the form of software programs 121–122. The programs 121–122 can be stored in the memory 120 while the computer is operating. The exact physical and virtual memory locations which are allocated to the programs 121–122 are maintained by page tables 125–126, respectively. The programs 121–122 can be portions of much larger software systems 131–132 persistently stored in the disk 130 while the system is operating, or not.

The software systems can be operating systems and applications systems. The programs 121–122 manipulate data. The data can also be stored in the memory 120 or in the disk 130 as a database (DB) 135. The data can also be communicated with the I/O interface 140.

Figure 2:
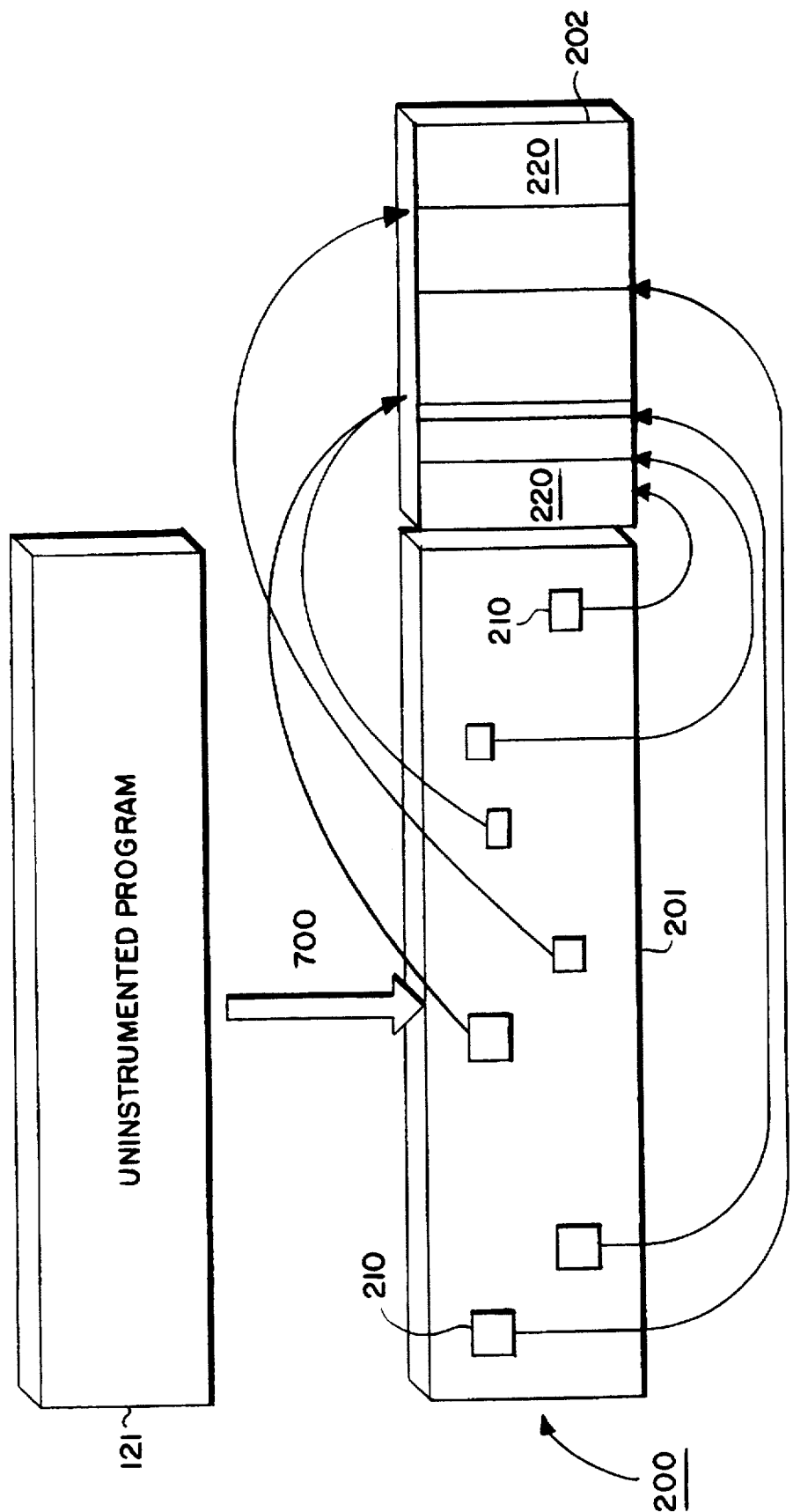
FIG. 2 is a block diagram of an uninstrumented and instrumented software program

FIG. 2 shows how the program 121 can be modified by an instrumentation process 700 to generate an instrumented program 200. A preferred method for instrumenting the program 121 is described in greater detail below. The instrumented program 200 includes the in-line instructions of program 121, e.g. the program 201, modified with instrumentation instructions 210. The instrumented program 200 also includes out-of-line instrumentation routines 202, e.g. routines 220. The instrumented program 200 can be used to monitor the performance of the computer system 100.

At predetermined locations of the program 121, the instrumentation points 210 are identified for instrumentation. Candidate instructions at the instrumentation points 210 are modified to divert the execution flow to the instrumentation routines 220. A typical instrumented program 201 may include hundreds, or thousands of such diverting instrumentation points 210. The number of instrumentation routines 220 may be smaller than the number of instrumentation points 210 if there is some overlap in the type of performance sampling done at each of the instrumentation points 210.

In the process 700 according to a preferred embodiment of the invention, the instrumentation of the program 121 is done in such a way that the total size of the instrumented program 201 is identical as the size of the uninstrumented program 121. In addition, the relative locations of the instructions of the instrumented and uninstrumented programs are identical.

To instrument a program extensively without changing its overall size is a problem. For example, the candidate instructions are preferred to be single word instructions. Then, the structure and execution flow is minimally disturbed. The candidate instructions can be replaced with one-word call instruction to instrumentation routines 220.

The one-word call instruction typically includes an operation code and a displacement. However, for very large programs it is not always possible to reach all instruction addresses with a one-word call instruction. The number of bits set aside for the displacement are generally less than the total number of bits which can be used to specify a virtual memory address. To reach any possible address of the memories, depending on machine architecture, typically requires at least two instructions. For example, one or more load instructions to store a large virtual address in one of the registers 111, and a jump instruction to the address specified in the register.

Obviously, directly replacing thousands of one-word candidate instructions with two-word, or three-word instruction points 210 would substantially change the size of the program and the relative addresses of the instructions. In other words, the instructions stored in address spaces of the uninstrumented and instrumented programs would no longer be stored at the same relative addresses, with respect to each other. This would result in a different execution flows, with respect to the instruction addresses spaces, while the program is gathering performance data. Described below is a technique for inserting instrumentation points in the program 121 so that the instrumented program 201 has instructions at the same relative addresses as the uninstrumented program 121, excepting the instrumentation routines 220 and the instrumentation points 210.

Making the uninstrumented and instrumented programs the same size makes possible the dynamic enablement and disablement of instrumentation while the programs are executing. Furthermore, while instrumentation is disabled, performance is not adversely affected, e.g. no instrumentation routines 220 associated with the instrumentation are executed.

Figure 3:
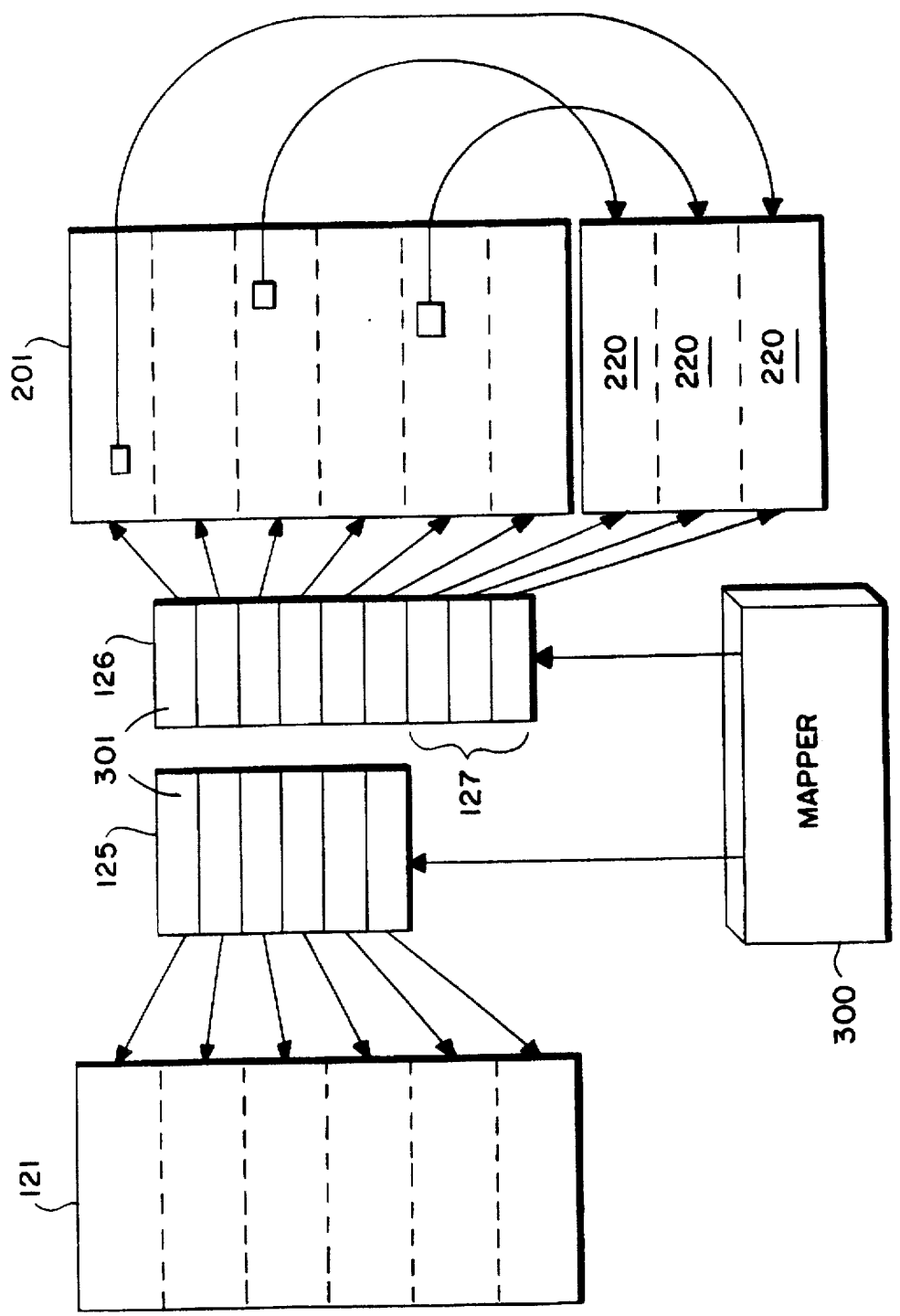
FIG. 3 is a block diagram of a mapping of the programs of FIG. 2 into a memory of FIG. 1.

As shown in FIG. 3, according to a preferred embodiment of the invention, the original uninstrumented program 121 and the instrumented version 200, e.g. the program 201 and instrumentation routines 220, are concurrently maintained in the memories 120 and 130 of FIG. 1. Maintained in memory meaning that each executable program has an associated paging table, respectively, 125 and 126. Each of the paging tables 125–126 has entries 301 for each of the pages of the programs 121 and 200.

In some systems, the paging tables 125–126 may be maintained as a single data structure, with the current contents of the entries 301 defining a mapping. For example, a first set of paging values stored in the entries of the table would map the uninstrumented program, and a second set of paging values would map to the instrumented program. Activating a "page table" in this case means loading the entries of the table with the appropriate paging values to map one or another program.

A mapper 300 dynamically activates either uninstrumented, or instrumented version of the program into the memories 120 and 130. This is possible since the two versions effectively occupy the identical address space, e.g. the instructions in the respective versions, other than the instrumentation points 210 and instrumentation routines 220, are located at the identical relative addresses. This means that the paging tables 125–126 can be dynamically activated without interfering with the natural execution flow of the program. Most modern computer systems have specialized instructions which allow one or more paging tables to be activated using simple processor specific instructions.

Figure 4:
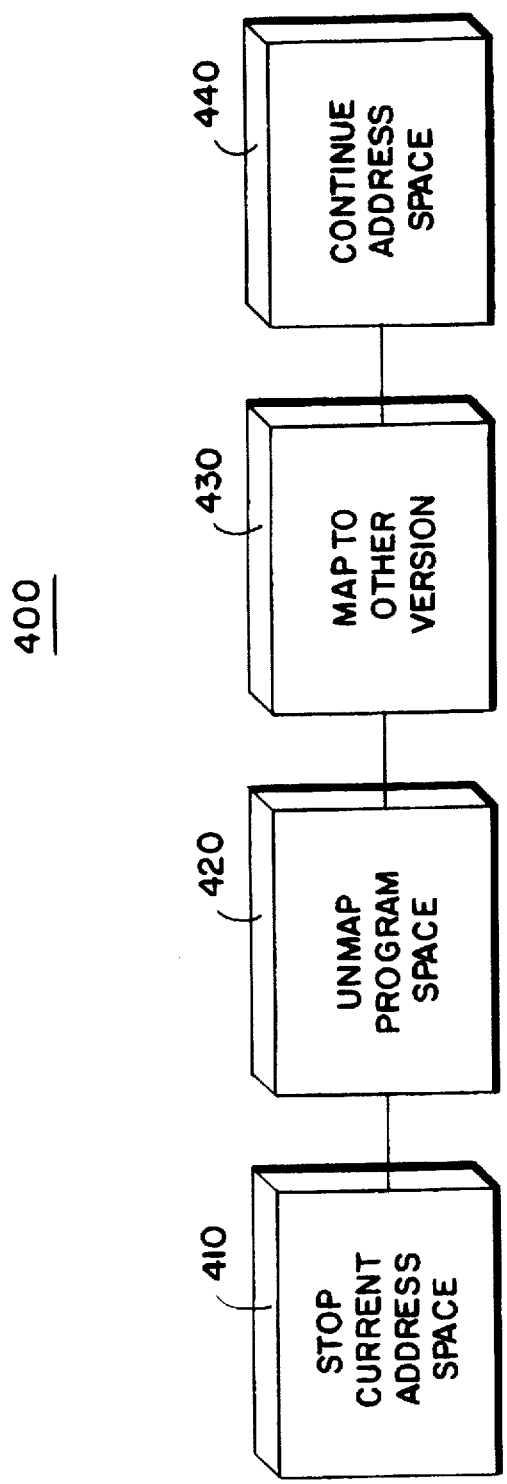
FIG. 4 is a block diagram of a process to dynamically map the programs of FIG. 3.

A process 400 used by the mapper 300 of FIG. 3 is illustrated in FIG. 4. In step 410, stop the current address space. In step 420, deactivate the current address space. Note, the pages 127 allocated to the instrumentation routines 220, once mapped, can remain mapped until the program completes. Thus, should the program be executing in the instrumentation routines 220 while the mapping is changed to the uninstrumented version, the execution will naturally flow back to the uninstrumented re-entry point after execution in a current instrumentation routine has completed.

In step 430, the instrumented program 201 is mapped into the memory 120 by activating the paging table 126. Execution is resumed in step 440 after the address space is activated.

In alternative embodiments, it is possible to have multiple versions of the instrumented program, each with an associated page table. Thus, depending, for example, on run-time conditions, different types of performance monitoring can be done by mapping to an appropriate instrumented version. Once the performance data has been sampled, normal execution can resume at any time by having the mapper 300 switch back to the uninstrumented version of the program 121.

Note, this implementation does not require that the instrumentation routines 220 be located at the end of the program. The routines 220 can be located in any address space which is mapped distinctly from the pages of the program 121. For example, the instrumentation routines can be located at memory addresses ahead of the program 121.

Figure 5:
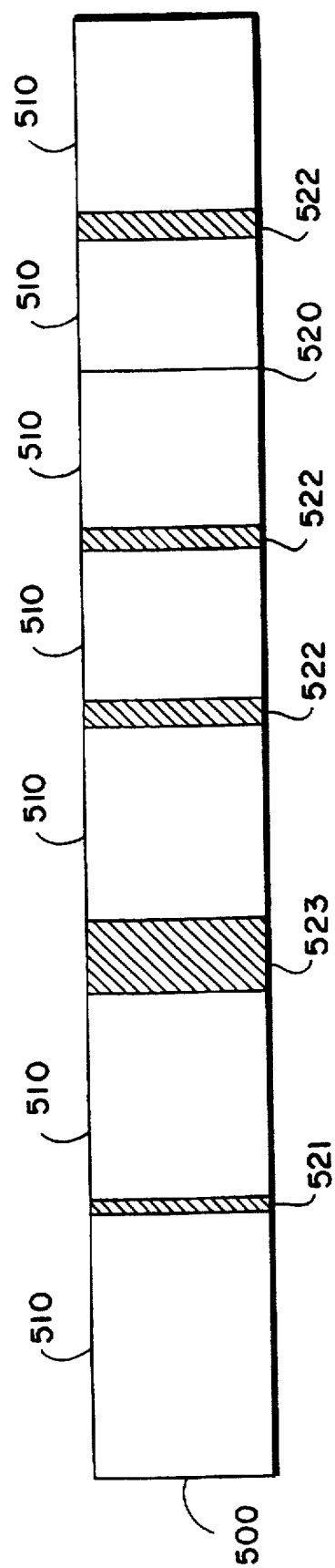
FIG. 5 shows a portion of the uninstrumented program.

A preferred solution for instrumenting the program 121 without increasing its overall size and to preserve overlapping instruction addresses spaces is now described. FIG. 5 shows a portion 500 of the uninstrumented program 121. The program 121 is organized by, for example, a compiler, into a plurality of procedures 510. Each procedure 510 including instructions related by their execution flow.

Because of addressing restrictions and variable instruction sizes, procedures 510 are generally aligned with memory address that are convenient to manipulate. For example, the alignment is on addresses which are multiples of 4 or 8 words. This results in gaps 521–523 between the procedures 510. For example, the gap 521 spans one word, the gaps 522 is two words, and the gap 523 is three words. The "gap" 520 is zero words, meaning that here two adjacent procedures naturally align.

If the gaps between the procedures can randomly be 0, 1, 2, or 3 words, and assuming that three words are required to jump to the instrumentation routines, then about every fourth gap will be a sufficient size to accept a three instruction instrumentation point. If only two words are required to reach the instrumentation routines 220, then about half of the gaps are available for routing.

This would be a partial solution if the number of points selected for instrumentation is less than one quarter the number of procedures. In actual practice, a single procedure may include dozens of candidate instructions for instrumentation observation points. This means that the number of instrumentation points can be orders of magnitude greater than the number of available gaps.

Figure 6:
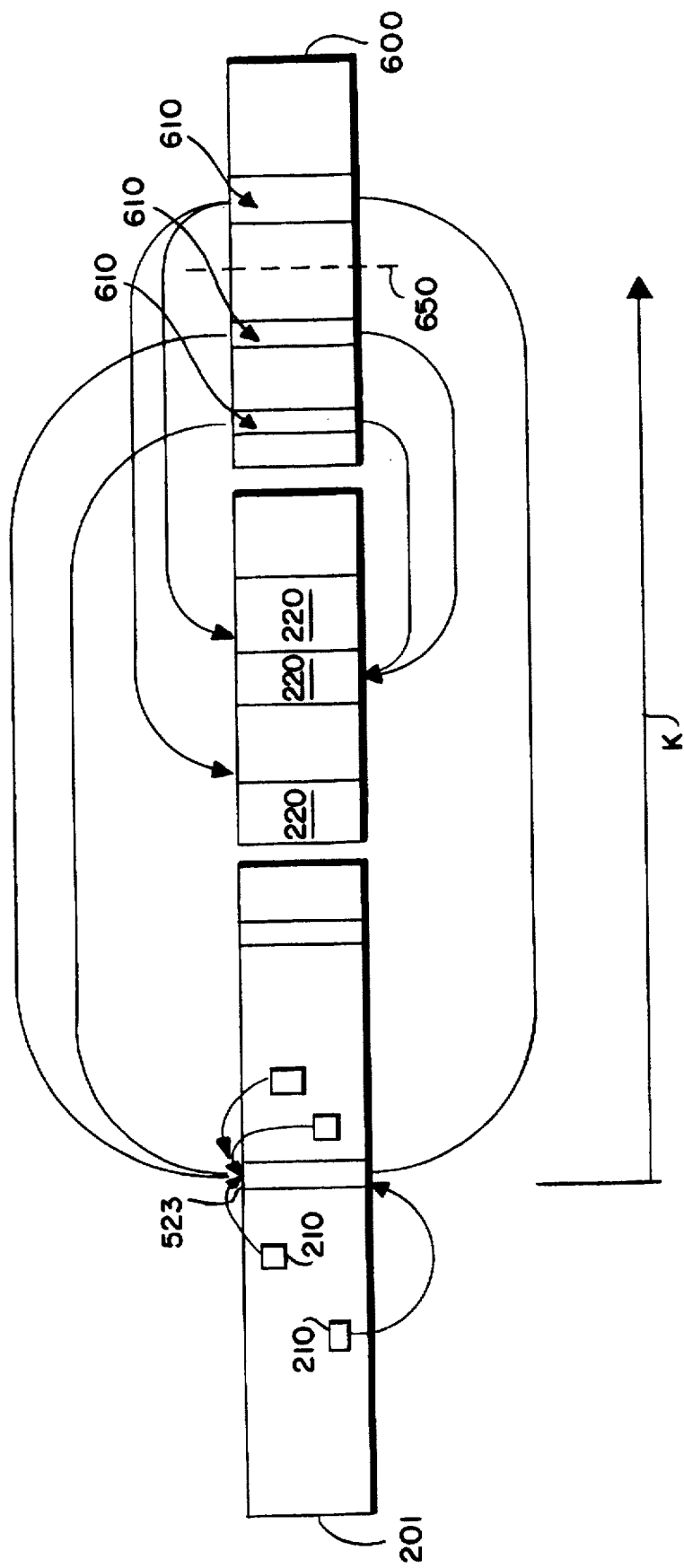
FIG. 6 is a block diagram of the instrumented program.
Figure 7:
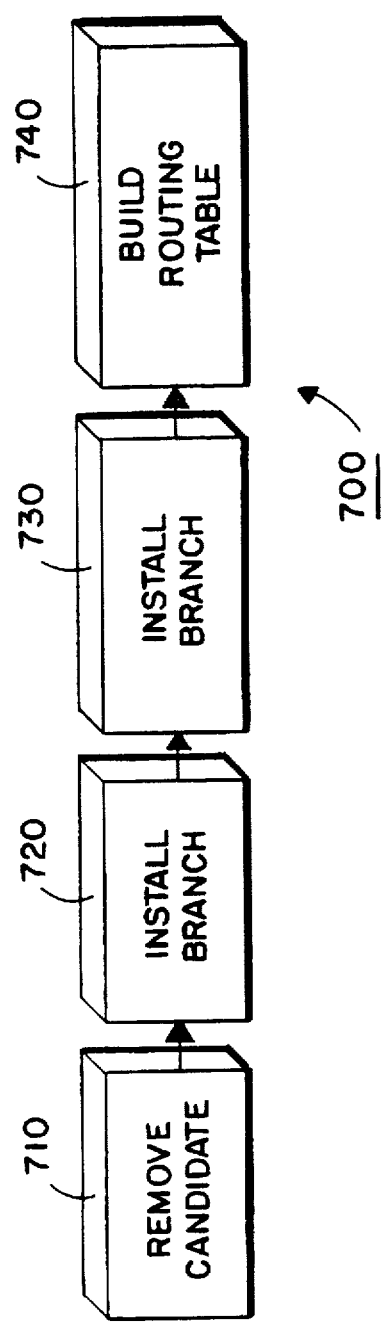
FIG. 7 is a flow diagram of a process for instrumenting the uninstrumented program.

FIGS. 6 and 7 will be used to describe a preferred routing for execution flow during instrumentation without substantially changing the address space alignments of the uninstrumented and instrumented programs, that is, making dynamic remapping possible. FIG. 6 shows a preferred routing from a large number of instrumentation points 210 through the smaller number of gaps, e.g. 523, via a routing table 600 to a plurality of instrumentation routines 220.

The routing table 600 includes a plurality of entries 610. Each entry is in the form of a branch instruction to one of the instrumentation routines 220.

A process 700 to instrument the program 121 to produce the directly mappable instrumented program 201 is shown in FIG. 7. In step 710, remove the one-word candidate instruction. The removed instruction can be stored in a reserved slot of the selected instrumentation routine. The removed instruction can later be executed, before on-line execution resumes. In step 720, install, at the address of the removed instruction a call instruction to one of the gaps 523 within range of the call instruction. A possible one-word call instruction could be:

"bsr ra, gap"

where, "bsr" means branch-to-subroutine. The return address is stored in one of the registers 111, e.g. "ra." The entry point of the subroutine is at the displaced address "gap," e.g. any of the gaps 523 within displacement range. In step 730, store a three instruction jump sequence in the gap 523 to route the execution flow to an entry 610 of the routing table 600.

The entry 610 which is selected has an address which is determined by taking the sum of the return address and a constant value k. The constant value k being the difference between an address which is approximately in the middle 650 of the routing table 600 and the address of the selected gap. The return address can be obtained from, for example register ra. For example, the three-word instruction sequence:

| ld  | ra, | r0 |
| add | k,  | r0 |
| jmp |     | r0 | where "ld, add, and jmp" are, respectively, load, addition, and jump type of instructions, and where, r0 is an available register 111, and k is the constant value, would accomplish the task.

The effect is that execution flow from different instrumentation points are muted through the same gap, but are redirected to different addresses of the routing table 600. The entries 610 of the routing table 600 are the branch instructions to the destination instrumentation routines 220. The entries 610 in the routing table 600 can be constructed in step 740.

Since the routing as described above "randomly" routes the execution flow through the entries of the routing table 600, occasionally collisions will occur. Collisions can be minimized by distributing the entries around the mid-point 650 of the table 600.

However, should an entry be already occupied during the building step 740, the entry may very well still be valid of the selected destination routine is valid for the current routing. However, if not, another gap can be selected to produce an unoccupied entry of the routing table 600, or, perhaps, an occupied entry which routes the execution flow to the desired instrumentation routine 220. Alternatively, at a relatively small cost, the size of the table 600 can be expanded to create additional unoccupied entries.

Figure 8:
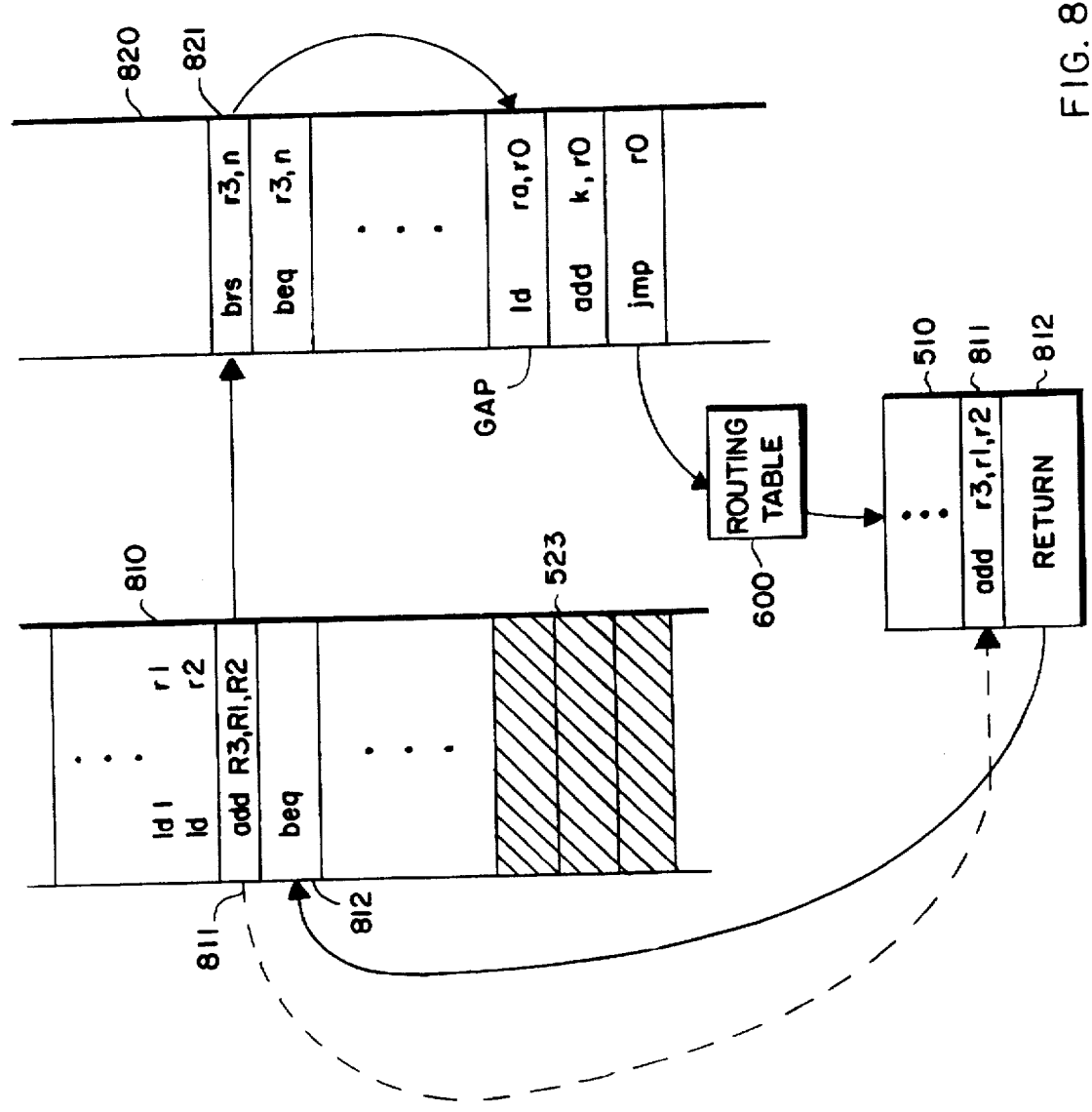
FIG. 8 shows the execution flow for the programs of FIG. 1.

FIG. 8 shows a portion 810 of program 121 and a portion 820 of the instrumented program 201. A candidate instruction 811 is removed, and the instrumentation point 821 is installed in its place. The gap 523 is filled with the three, or perhaps two routing instructions at displaced address "gap." Then, the entry 610 in the table 600 can be constructed using procedure 510 and removed instruction 811.

In response to a signal, internal, or external, the mapping tables 125 and 126 can be selectively activated Activation meaning that the page values of the tables are loaded into, for example, machine dependant mapping registers. This will cause the "activated" pages to be physically accessible.

The signal can be operator induced, an interrupt caused by a hardware event, or a software interrupt generated by, perhaps, the uninstrumented program itself. While the portion 810 is mapped, the execution flow proceeds in-line. There is no evidence of any type of performance monitoring.

In response to a subsequent signal, the paging table 126 is activated. When the program portion 820 is mapped in, execution flow is from the instrumentation point 821, though the gap 523, the entry of the routing table 600, to the instrumentation routine 220. As a last step in the instrumentation routine 220, the removed instruction 811 is executed, and execution flow proceeds in-line with the instruction 812 following the removed instruction 811.

A next subsequent signal can be used to re-activate the mapping table 125. Reactivation of the uninstrumented program can be performed as follows. First, an intermediate form of the uninstrumented program is mapped. This intermediate form includes the instruction sequences in the gaps 523 as described above. However, this version does not include any of the instrumentation points 210. This intermediate form of the instrumented program can be generated by omitting the instrumentation points 210 from the instrumented program 200.

This means, that the intermediate form of the program can not transfer execution to instructions in the gap 523, but if the program is executing instructions in a gap, those instructions will remain mapped so execution will naturally flow into an uninstrumented portion of the program. After the CPU 110 has executed a number of instructions which is greater than the number of instructions in the gaps 523, e.g. three, the original uninstrumented program can be activated.

The mapping of the instrumentation routines 220 can be left in place longer, depending on the exact implementation of the routines 220. For example, the instrumentation routines 220 can indicate when execution in the routines has been completed. At this time, the routines can be unmapped to allow the pages used for the routines to be used for other software.

In an alternative remapping scheme, the address space of the instrumented program is stopped, e.g., step 410 FIG. 4. and then the current program counter (PC) of the instrumented program is examined. If the program counter is in one of the gaps 523, or in the instrumentation routines 220, continue the address space, and re-sample the PC later. If the PC is not in a gap 523, or in the instrumentation routines 220, restore the uninstrumented program, step 430, and continue its address space, step 440.

The foregoing description has been directed to specific embodiments of this invention. It will be apparent, however, that variations and modifications may be made to the described embodiments, with the attainment of all or some of the advantages. Therefore, it is the object of the appended claims to cover all such variations and modifications as come within the spirit and scope of the invention.

I claim:

1. A method for monitoring the performance of computer systems, comprising:

storing an uninstrumented program in a memory of a computer system, the uninstrumented program having a first paging table and instructions stored in addresses;

storing an instrumented program in the memory, the instrumented program having a second paging table, the instrumented program including a plurality of instrumentation points for routing the execution flow to a plurality of instrumentation procedures, the instrumented program having instructions stored at identical relative addresses as the instructions of the uninstrumented program;

activating the first paging table to execute the uninstrumented program; and in response to a signal, activating the second paging table to execute the instrumented program.

2. The method as of claim 1 further comprising:

while executing the instrumented program, activating the first paging table, in response to the signal, to execute the uninstrumented program.

3. The method of claim 1 wherein the instrumented program includes a plurality of procedures aligned at predetermined memory addresses to create gaps between the plurality of procedures, and the uninstrumented program includes candidate instructions at memory addresses to monitor the performance of the computer system, and further comprising:

storing instrumentation instructions at the memory addresses of the candidate instructions;

storing routing instructions in the gaps, the instrumentation instructions calling the routing instructions in the gaps;

storing branching instructions in a routing table, the routing instructions directing execution flow to the branching instructions of the routing table, and the branching instructions to direct execution flow to the instrumentation routines.

4. The method of claim 3 further comprising:

determining a difference in memory addresses between the middle of the routing table and a first one of the gaps;

adding the difference to a return address of a first instrumentation instruction and calling a first set of routing instructions in the first gap to determine a memory address of a first entry in the routing table to store a first one of the branching instructions to direct the execution flow to a first instrumentation routine for monitoring the performance of the computer system when executing the first instrumentation instruction.

5. An apparatus for monitoring the performance of a computer system comprising:

a compiler for generating an uninstrumented program, the uninstrumented program including a candidate instruction at an address selected for performance monitoring;

means for generating an instrumented program from the uninstrumented program, the instrumented program including an instrumentation instruction at the address selected for performance monitoring, the instructions of the uninstrumented program and the instructions of the instrumented program stored at identical relative memory addresses;

a first set of paging values mapping the uninstrumented program into a memory of the computer system;

a second set of paging values to map the instrumented program and an instrumentation routine into the memory of the computer system, the instrumentation routine to be called by the instrumentation instruction;

means, responsive to a signal while executing the uninstrumented program, for activating the second set of paging values to execute the instrumented program.

6. The apparatus of claim 5 further comprising:

a routing table for directing the execution flow from the instrumentation instruction to the instrumentation routine.

7. A method for executing a computer program, comprising the steps of:

activating the execution of an uninstrumented program;

prior to completion of the execution of the activated uninstrumented program, activating an instrumented program having an instrumentation routine for routing the execution flow to a plurality of instrumentation procedures; and upon completion of the instrumentation routine, reactivating execution of the uninstrumented program.

8. The method of claim 7, wherein the instrumented and uninstrumented programs have instructions stored at identical relative addresses.

9. The method of claim 7, wherein the uninstrumented program includes a first paging table and the instrumented program includes a second paging table.

10. The method of claim 9, further comprising: activating the first paging table to execute the uninstrumented program and, in response to a signal, activating the second paging table to execute the instrumented program.

11. The method of claim 10, further comprising: while executing the instrumented program, activating the first paging table, in response to the signal, to execute the uninstrumented program.

12. The method of claim 7, wherein the uninstrumented program includes a plurality of procedures aligned at predetermined memory addresses to create gaps between the plurality of procedures, and the uninstrumented program includes candidate instructions at memory addresses to monitor the performance of the computer system, and further comprising:

storing instrumentation instructions at the memory addresses of the candidate instructions;

storing routing instructions in the gaps, the instrumentation instructions calling the routing instructions in the gaps;

storing branching instructions in a routing table, the routing instructions directing execution flow to the branching instruction of the routing table, and the branching instructions to direct execution flow to the instrumentation routines.

13. The method of claim 12 further comprising:

determining a difference in memory addresses between the middle of the routing table and a first one of the gaps;

adding the difference to a return address of a first instrumentation instruction and calling a first set of routing instructions in the first gap to determine a memory address of a first entry in the routing table to store a first one of the branching instructions to direct the execution flow to a first instrumentation routine for monitoring the performance of the computer system when executing the first instrumentation instruction.

14. A computer system comprising:

an uninstrumented program stored on a memory device:

an instrumented program stored on the memory device, the instrumented program including a plurality of instrumentation points for routing the execution flow of the instrumented program to a plurality of instrumentation procedures;

a mapping unit for storing the uninstrumented program and the instrumented program into the memory at related addresses.

15. The apparatus of claim 14 further comprising:

a routing table for directing the execution flow from the instrumentation points to the instrumentation procedures.

16. The apparatus of claim 14, wherein the uninstrumented program includes a candidate instruction at an address selected for performance monitoring; and the instrumented program includes an instrumentation instruction at an address selected for performance monitoring, the instructions of the uninstrumented program and the instructions of the instrumented program stored at identical relative memory addresses.

17. The apparatus of claim 14, further comprising:

a first paging table mapping first paging values of the uninstrumented program to first addresses in the memory of the computer system;

a second paging table mapping second paging values of the instrumented program to second addresses in the memory of the computer system.

\* \* \* \* \*